United States Patent [19]
Ito et al.

[11] Patent Number: 5,210,673
[45] Date of Patent: May 11, 1993

[54] THIN-FILM HARD DISK MAGNETIC MEDIUM

[75] Inventors: Motoyuki Ito, Tsuchiura; Tadashi Shinohara, Chiyoda, both of Japan

[73] Assignee: Hitachi Metals, Ltd., Tokyo, Japan

[21] Appl. No.: 758,874

[22] Filed: Sep. 9, 1991

[51] Int. Cl.$^5$ ............................................. G11B 5/82
[52] U.S. Cl. ................................... 360/135; 428/64; 428/694 BP
[58] Field of Search ................... 360/131, 135; 428/64, 428/694, 695

[56] References Cited

U.S. PATENT DOCUMENTS

| | | | |
|---|---|---|---|
| 4,564,549 | 1/1986 | Suzuki et al. | 428/147 |
| 4,803,577 | 2/1988 | Ezaki et al. | 360/102 |
| 4,842,917 | 6/1989 | Ohno et al. | 428/141 |
| 4,871,625 | 10/1989 | Dekura | 428/695 |
| 4,939,614 | 7/1990 | Shirakura et al. | 360/135 |
| 4,973,496 | 11/1990 | Kruger et al. | 427/129 |
| 4,996,622 | 2/1991 | Takatsuki et al. | 360/135 |
| 5,080,948 | 1/1992 | Morita et al. | 360/135 |
| 5,094,896 | 3/1992 | Morita et al. | 428/64 |
| 5,119,258 | 6/1992 | Tsai et al. | 360/135 |
| 5,144,512 | 9/1992 | Ota et al. | 360/135 |

OTHER PUBLICATIONS

English Abstract of EP 438-177 A, filed Jan. 18, 1991.

*Primary Examiner*—Bruce C. Anderson
*Attorney, Agent, or Firm*—Finnegan, Henderson, Farabow, Garrett & Dunner

[57] ABSTRACT

A thin-film hard disk magnetic medium comprising a magnetic recording film made from a magnetic metal alloy formed on a circumferentially textured surface of a substrate, in order that the surface of the magnetic recording layer is provided with a surface roughness, Rmax of 100 Å to 400 Å, and adjacent grooves form a space of 0.5 μm to 3 μm measured in the radial direction of the substrate.

3 Claims, 1 Drawing Sheet

THIN-FILM HARD DISK MAGNETIC MEDIUM

BACKGROUND OF THE INVENTION

The present invention relates to thin-film hard magnetic media which permit information to be written to or read from it by the use of a magnetic head, and more particularly to magnetic recording media having either microscopic grooves called texture on its surface or an uneven surface.

Heretofore, magnetic disk drives have been employed so that information can be written to or read from magnetic recording media. For this purpose, the space between a magnetic head and a magnetic recording medium is usually maintained at a very small value, say between 0.2 and 0.3 μm.

If the head makes frictional contact or collides with the recording medium, they will be worn down or get damaged. To avoid this undesirable phenomenon, a floating head slider carrying a magnetic head is used. In particular, because of a speed difference between the slider and the surface of the recording medium a hydrodynamic floating force is produced in the gap between them to maintain the minute space between them.

However, when the magnetic recording medium is stopped, the aforementioned hydrodynamic floating force is not set up and, therefore, the slider is in contact with the medium and locked. Since the surfaces of the slider and of the medium are fabricated quite accurately, the slider may be attracted to the medium when they are at rest or stopped as described above. If the slider is attracted to the medium in this way, a quite large torque is needed to start or stop the medium. Consequently, it may become impossible to start the medium, or the head makes a frictional contact with the medium, damaging the contact surfaces. As a result, they can no longer be used. In this way, various problems take place.

The means normally adopted to solve the above-described problems is to form microscopic grooves called a texture on the surface of the magnetic recording medium or to make the surface of the medium uneven. If the slider is brought into a stop on the medium, the slider is prevented from being attracted to the medium by the texture or the uneven surface.

A known method of forming the texture described above is to etch pits or holes in random directions. A more common method consists in rotating a substrate for a magnetic recording medium and pressing an abrasive tape against the surface of the subtrate by a pair of pressure rolls made from a resilient material such as rubber. Another common method is to press a disklike abrasive rotary member against the surface of the substrate. The obtained texture can be a desired one of various patterns. In one pattern, grooves are coaxial about the center of rotation of the substrate. In another pattern, grooves intersect the circumferential direction of the substrate at an angle that is not constant.

The prior art pattern of the texture on the substrate has been hardly studied. The principle of the prior art method relies only on the formation of grooves or on making the surface uneven. Therefore, even if a desired texture is actually formed on the surface of the substrate, the intended decrease in the friction coefficient between the surface of the recording medium and the magnetic head slider is not one as expected when they are used in practice. Consequently, the contact start and stop (CSS) characteristics and other characteristics of the magnetic recording medium are not satisfactory.

Next we explain the CSS characteristics. A repeated rubbing contact of a magnetic head slider with a magnetic recording medium which occurs at times of ON/OFF of the power switch of a disk driving apparatus causes abrasion and damage of surfaces of the both part.

As the magnetic recording layer on the surface of a magnetic recording medium is especially easy to be damaged, it is necessary to provide lubrication on the surface of the magnetic recording layer. As a contrary phenomenon to the above stated one, sometimes an adhesion of a slider to a surface of a magnetic recording medium occurs. That happens in a case that each of them has an extremely smooth contact surface.

When the adhesion force between the slider and the magnetic recording medium exceeds the torque of the moter which move the magnetic recording medium, it can not be rotated and it does not work. In order to avoid abrasion, damage and adhesion of the recording medium with a magnetic head slider, it is general to make the surface of the recording medium rough (texture formation). That is a general way to improve such characteristics. The characteristics of the surface of the recording medium concerning the adhesion poperties and lubricative properties are called as CSS characteristics.

Some examples are known to arrange the roughness of the textured surface in a determined range. But in such a case it is sometimes difficult to unify the CSS characteristics, for example friction coefficient of the surface of the recording disks. That causes problems concerning reliaility and durability of the magnetic recording disks.

The requirement for higher recording density and more increase of recording capacity of a recording medium is becoming more and more strict. Although it is natural to enhance the accuracy to form the magnetic recording media to reply to the requirement, it is necessary to achieve the most preferable figure of the texture and to improve the CSS characteristics.

Moreover recently in addition to the improvement of the CSS characteristics it is required to improve also the stability of floating properties of the magnetic recording medium and the glide characteristics in relation to the magnetic head.

Next we state the glide characteristics of thin-film hard disk magnetic media. In order to enhance the recording density it is necessary to reduce the size of recording bits on the magnetic recording layer of the media. In order to make the recording bits size smaller it is necessary to reduce the flying height of the magnetic head on the surface of the magnetic recording media. In such cases the floating stability of the magnetic head is important for read/write on the magnetic recording medium. If the slider would collide to uneven portions of the surface of the magnetic recording medium, the stability of the slider would be reduced and it would cause anomalies of reading signals and/or non-uniformity of the bit lengths by a slight change of the recording signals. Moreover the collision of the slider to the uneven portions of a recording medium causes anomalous contacts of the slider with the recording medium.

As stated above it is necessary to keep the surface of the recording medium smooth in order that the slider floats stably on the magnetic recording medium even if the glide height is extremely small. The smoothness of the surface of magnetic recording media is clled as glide charactersistics.

As a result of strict requirement to increase the recording capacity and the recording density, the gap between a surface of a recording disk and a magnetic head slider is required to be more reduced, and such a requirement is difficult to be satisfied by prior arts.

SUMMARY OF THE INVENTION

The present invention is intended to solve the foregoing problems with the prior art techniques. It is an object of the invention to provide a magnetic recording medium having a substrate on which a texture is created in a given pattern, whereby exhibiting reliable and excellent CSS characteristics and excellent glinding characteristics.

The above object is achieved in accordance with the teachings of the invention by a magnetic recording medium comprising a substrate made from a nonmagnetic material and a magnetic recording layer made from a magnetic material where a texture formed on the surface of the magnetic recording medium. The texture is consisiting of grooves formed in the circumferential direction of the substrate. The surface of the recording medium has a surface roughness, Rmax of 100 Angstroms to 400 Angstroms and the space of the adjacent grooves is a value of 0.5 $\mu$m to 3 $\mu$m. Generally the magnetic recording layer is formed on on an undelayer made of chromium on the substrate.

In the present invention a more preferable result can be obtained by restricting the maximum undulation of the surface of the magnetic recording disk having a cycle of 4 mm or less measured along the radial direction of the disk in a value of 300 angstroms or less.

DETAILED DESCRIPTION OF THE INVENTION

Figure 1:
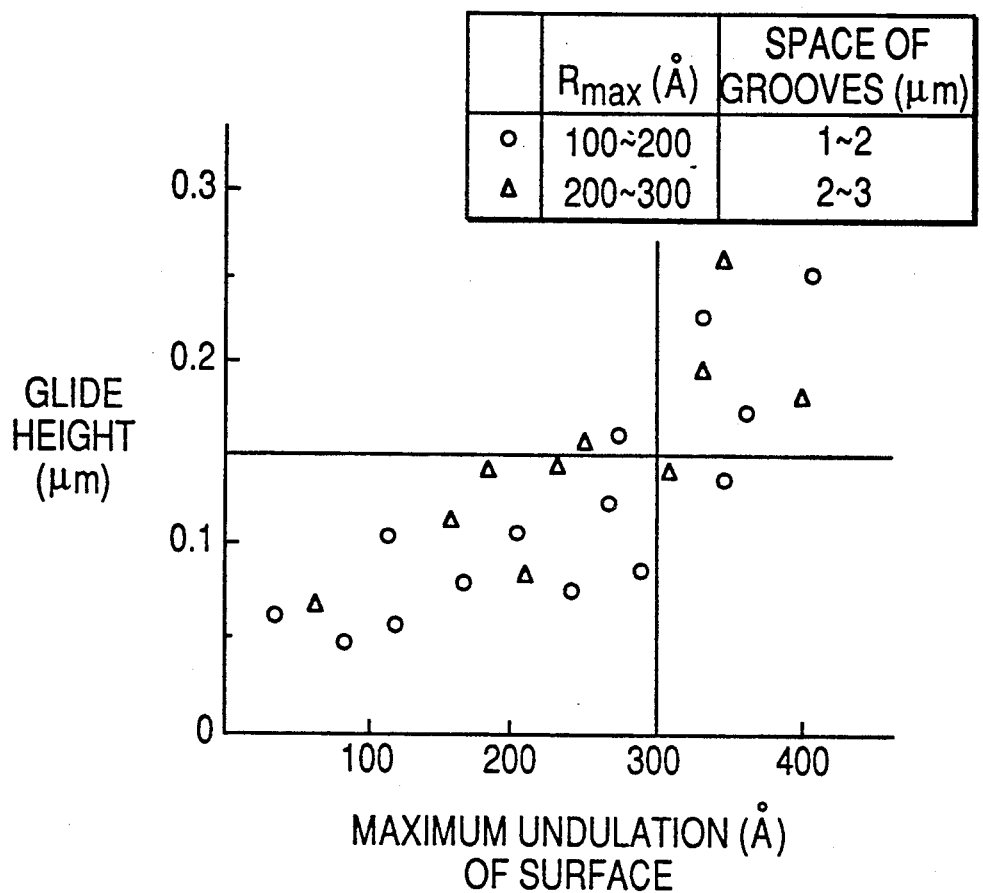
FIG. 1 is a diagram to show the relation between the maximum undulation and the glide height.
Figure 2:
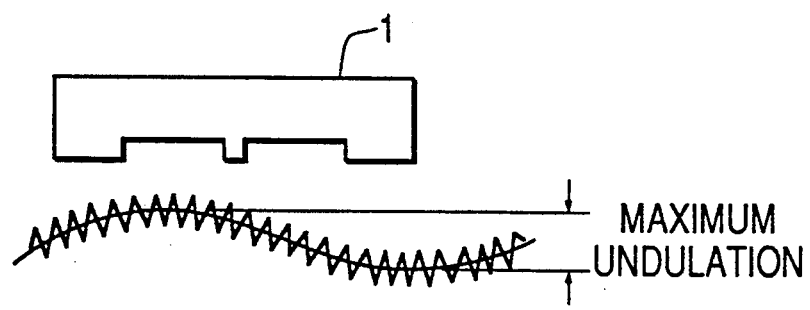
FIG. 2 is an explanatory drawing showing the relation between the width of the magnetic recording head and the undulation in the radial direction of the magnetic recording medium.

In the present invention the roughness of the surface of a disk can be measured by a contact needle type roughness meter where the radius of curvature at the tip of the needle is 2.5 $\mu$m. If the surface roughness, Rmax of a magnetic recording disk is a value of less than 100 Å, the magnetic head tends to adhere to the disk surface because of the much smoothness of the surfaces even if the surface is not slushed with lubricant material, so that an excess torque is needed to move the magnetic disk at occasions of start and sometimes it happens that the disk does not work. The thickness of the lubricant layer shall be less than 15 Å when the surface roughness is a value of 100 Å to 150 Å, because the adhesive phenomenon of the head to the disk surface would occur if not.

When the space between the grooves is a value of less than 0.5 um, it is difficult to make the surface roughness, Rmax of 100 Å or more than 100 Å and a similar adhesive rent phenomenon would occur.

On the other hand, if the surface roughness, Rmax exceeds 400 Å or the space between grooves of the texture exceeds 3 $\mu$m measured along the radial direction of the disk, the contact surface between the magnetic head and the disk surface becomes too large and moreover the non-uniformity of heights of the uneven surface becomes big and the contact force becomes partially too big that the surface of the recording medium would be damaged or the friction coefficient becomes too big.

When the maximum value of undulation of the disk surface having a period of less than 4 mm exceeds 300 Å, the smoothness of the disk surface would be harmed and the floating stability of a magnetic head or the gliding characteristics would be unpreferably lowered.

Generally the undulation effects to the floating stability of the magnetic head slider, so the gliding characteristics. As a width of a magnetic head slider is about 3 mm, the undulation does not harm the floating stability of a magnetic head slider if the period of the undulation is a value of less than the width. So it is enough to consider only undulations having a period of 4 mm or less. The above stated values of the undulation is values measured along the radial direction. The period of the undulation is an extremely small value as a value of 300 Å or less when it is measured along the circumferential direction.

By the above stated figures, the CSS characteristics can be well improved and we can provide excellent gliding characteristics to thin-film hard disk magnetic media.

EXAMPLE 1

Firstly an aluminum substrate coated with a Ni-P plating layer and having an outside diameter of 3.5 inches was coated with a 2000 Å thickness of chromium underlayer by a D.C. sputtering process. The underlayer was provided with several kind of textures. Then the textured chromium surface was covered by a magnetic recording layer of Co-Cr-Ta alloy(Co: 81 wt %, Cr: 10.2 wt %, Ta: 8.8 wt %) having a thickness of 350 Angstroms in argon atmosphere by a D.C. sputtering process. The disk was covered by a 200 Å thickness of carbon protective layer formed by a D.C. sputtering process. The magnetic recording disk was applied with a 18 Angstroms to 20 Angstroms thickness of liquid lubricant on its surface. Each of the disks produced by the above stated steps has a surface roughness and a space between grooves measured along the radial direction of the disk as shown in Table 1.

We conducted CSS tests for the magnetic recording disks produced by the above stated steps according and incorporated in a magnetic recording apparatus. The test results are shown in Table 1 where the friction value is one measured after 30,000 times of CSS tests. The used heads in the tests are mini-monolithic type of Mn-Zn ferrite heads having a track width of 20 $\mu$m. The magnetic head slider has a width of 610 $\mu$m and it was provided with a zimbal spring pressure of 9.5 gf. The flying height was 0.2 $\mu$m at a radial location of 24 $\mu$m, the maximum rotational number is 3,600 rpm and a CSS test cycle was 30 seconds.

TABLE 1

| No. | SURFACE ROUGHNESS R max (Å) | SPACE OF GROOVES (μm) | FRICTION COEFFICIENT | UNDULATION (Å) | GLIDE HEIGHT (μm) | OTHERS |
|---|---|---|---|---|---|---|
| REF. (1) | | | | | | |
| 1 | 80 | 0.3 | — | 70 | 0.04 | ADHERENCE |
| 2 | 80 | 0.4 | 0.8 | 60 | 0.03 | OF SLIDER |
| EXAMPLE | | | | | | |
| 3 | 100 | 0.5 | 0.45 | 65 | 0.04 | |
| 4 | 100 | 1.0 | 0.5 | 70 | 0.045 | |
| 5 | 140 | 1.0 | 0.4 | 85 | 0.05 | |
| 6 | 180 | 1.3 | 0.35 | 80 | 0.06 | |
| 7 | 200 | 1.5 | 0.4 | 85 | 0.06 | |
| 8 | 240 | 2.0 | 0.4 | 100 | 0.08 | |
| 9 | 260 | 2.0 | 0.45 | 130 | 0.10 | |
| 10 | 300 | 2.0 | 0.5 | 180 | 0.13 | |
| 11 | 350 | 2.5 | 0.5 | 240 | 0.13 | |
| 12 | 400 | 3.0 | 0.5 | 280 | 0.15 | |
| REF. (2) | | | | | | |
| 13 | 450 | 3.0 | 0.7 | 320 | 0.18 | |
| 14 | 500 | 4.0 | — | 360 | 0.20 | DAMAGE ON SURFACE |
| 15 | 550 | 4.0 | — | 400 | 0.25 | DAMAGE ON SURFACE |

As shown in Table 1, the No. 1 disk is provided with unsatisfied texture characteristics because of the too small surface roughness, Rmax and the too small space between the texture grooves. It caused unpreferable adhesion phenomena of the magnetic head with the surface of the magnetic recording disk. The No. 2 test sample is provided with anomalously big friction coefficient, maybe because of unsatisfactory texture functions. On the contrary the No. 13 sample is provided with an anomalously big friction coefficient because of the too big surface roughness, Rmax and the too big space between the texture grooves. The No. 14 and No. 15 samples are damaged on surfaces of the magnetic recording media. Generally a preferable value of friction after 30,000 times of CSS tests is 0.5 or less as well known. The friction coefficient of the samples No. 12 and No. 13 is too big compared with the general value.

On the other hand the samples of No. 3 to No. 12 according to the present invention are provided with a low friction coefficient after 30,000 times of CSS tests and we did not find any recongnizable damage on the surface of these magnetic recording media.

The test results concerning the relation between the maximum value of undulation having a period of 4 mm or less and the glide height measured for the example disks are shown in FIG. 1. The glide heights were measured by the following steps. We measured the maximum flying height detected by an output of a pulse wave from a piezoelectric device attached to the back of the magnetic head slider. The glide height is the maximum flying height measured by the above stated way.

As understood from FIG. 1, the magnetic recording disk for which the glide heights were measured, have a surface roughness, Rmax and a space of grooves measured along the radial direction which correspond to the values of the samples of No. 3 to No. 12. But there is a tendency that the glide height becomes bigger and bigger according to the increase of the maximum value of undulation, although they are provided with good CSS characteristics. As the requirement of glide characteristics for magnetic recording media becomes more and more strict, it is necessary to control the glide height in values of 0.15 μm or less, preferably 0.125 μm or less. It is necessary to make the maximum value of undulation in a value of 300 Å or less in order to keep the smoothness of the recording disk surface. Although we stated the disks incorporating an aluminum substrate, we can use aluminum alloys, ceramic materials, glasses or other materials according to the teachings of the present invention. It is possible to cover the substrate with a hard coating layer made of chromium, Ni-P, Ni-Cr-P, almite and others in consideration of the substrate materials. The magnetic recording layer can be made of Co, Co-Ni, Co-Ni-Cr, Co-Ni-Pt, Co-Ni-P, Co-Pt and others than Co-Cr-Ta. The magnetic head can be a Mn-zn ferrite head, a composite type of head, a thin film type of head or others.

As above stated, the magnetic recording media according to the present invention can be provided with excellent CSS characteristics and also excellent glide characteristics.

What is claimed is:

1. A thin-film hard disk magnetic medium comprising a magnetic recording film made from a magnetic metal alloy formed on a circumferentially textured surface of a substrate, characterized in that the surface of the magnetic recording layer is provided with a surface roughness, Rmax of 100 Å to 400 Å, and adjacent grooves form a space of 0.5 μm to 3 μm measured in the radial direction of the substrate.

2. The thin-film hard disk magnetic medium of claim 1, wherein the maximum undulation having a period of 4 mm or less measured in a radial direction at an arbitrary position on the surface is a value of 300 Å or less.

3. The thin-film hard disk magnetic medium of claim 1, where the magnetic recording layer is formed on a metal underlayer formed on a metal-plated aluminum substrate and coated with lubricant material.

* * * * *